US005703192A

United States Patent [19]

Sugama

[11] Patent Number: 5,703,192
[45] Date of Patent: Dec. 30, 1997

[54] POLYORGANOMETALLOSILOXANE-2- OR -4-PYRIDINE COATINGS

[75] Inventor: Toshifumi Sugama, Wading River, N.Y.

[73] Assignee: Associated Universities, Inc., Washington, D.C.

[21] Appl. No.: 563,977

[22] Filed: Nov. 29, 1995

[51] Int. Cl.⁶ .................................................. C08G 77/26
[52] U.S. Cl. .......................... 528/39; 528/40; 556/407; 546/14; 428/447; 427/387; 106/287.11
[58] Field of Search .................. 556/407; 528/40, 528/39; 546/14; 428/447; 427/387; 106/287.11

[56] References Cited

U.S. PATENT DOCUMENTS

| 3,002,989 | 10/1961 | Awe et al. | 260/448.2 |
|---|---|---|---|
| 4,131,609 | 12/1978 | Wynne et al. | 260/314.5 |
| 4,311,738 | 1/1982 | Chi | 427/387 |
| 4,347,347 | 8/1982 | Yajima et al. | 528/30 |
| 4,622,170 | 11/1986 | Wynne et al. | 252/518 |
| 4,828,917 | 5/1989 | Wegner et al. | 428/333 |
| 4,898,956 | 2/1990 | Hilty | 556/401 |
| 4,950,583 | 8/1990 | Brewer et al. | 430/311 |
| 5,045,399 | 9/1991 | Niebylski | 428/447 |
| 5,200,237 | 4/1993 | Sugama | 427/380 |
| 5,216,155 | 6/1993 | Laine et al. | 544/181 |
| 5,292,851 | 3/1994 | Lau et al. | 528/38 |

OTHER PUBLICATIONS

Sugama et al. "Polymetallosiloxane Coatings Derived from Two–Step, Acid–Base Catalyzed Sol Precursors for Corrosion Protection of Aluminum Substrates", *Journal of Coatings Technology* 65 No. 826, pp. 27–36 (Nov. 1993).
Sugama et al., "Zirconocene–modified polysiloxane–2–pyridine coatings", Thin Solid Films; pp. 174–184, 1995.

*Primary Examiner*—Margaret W. Glass
*Attorney, Agent, or Firm*—Margaret C. Bogosian

[57] ABSTRACT

A new family of polyorganometallosiloxane-2- or -4-pyridine compounds are provided for corrosion resistant coatings on light metals such as aluminum, magnesium, zinc, steel and their alloys. The novel compounds contain backbones modified by metal alkoxides, metallocenes and metallophthalocyanates where the metal is Zr, Ti, Mo, V, Hf, Nb, Si, B and combinations thereof. Methods of making the new compounds are also provided.

17 Claims, 11 Drawing Sheets

POLYORGANOMETALLOSILOXANE-2- OR -4-PYRIDINE COATINGS

This invention was made with Government support under Contract No. DE-AC02-76CH00016, between the U.S. Department of Energy and Associated Universities, Inc. The Government has certain rights in the invention.

BACKGROUND OF THE INVENTION

This invention relates to a group of novel compounds which are useful as corrosion resistant coatings. More specifically, the novel compounds include polysiloxane-2- or -4-pyridine polymers containing backbones modified with metal alkoxide, metallocene

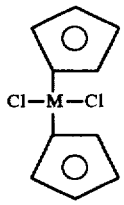

and metallophthalocyanate

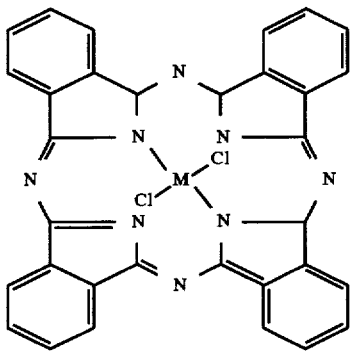

where the metal is Zr, Ti, Mo, V, Hf, Nb, Si, B and combinations thereof.

The corrosion of metals used in airplanes induced by the action of acids, salts or atmospheric pollution is well known. To minimize metal corrosion many protective coating compositions have been proposed. For example, protective coatings used in the past have included ceramic coatings. However, known ceramic coatings have many shortcomings when used on metallic substrates. First, some ceramic coatings, such as zirconium oxide and zirconalumina-silicate do not adhere well and do not have a satisfactory expansion coefficient especially during temperature cycling. As a result, the coating separates from the substrate. Second, many ceramic coatings can be applied and processed as coatings only at high temperatures exceeding 1000° C. using expensive electronic beam or related methods. As a result, aluminum and its alloys and other low melting point materials are not easily corrosion protected.

Accordingly, there is still a need in the art of corrosion protective coatings and, especially, coatings for light weight metals for ceramic coatings which adhere tenaciously to metallic substrates and can be applied at room temperature by using inexpensive and simple methods.

SUMMARY OF THE PRESENT INVENTION

The present invention, which addresses the needs of the prior art, provides a new family of compounds which are useful for corrosion protective coatings for light weight metals such as aluminum, zinc magnesium, steel and their alloys. The new family of compounds include polyorganosiloxane-2- or -4-pyridine polymers

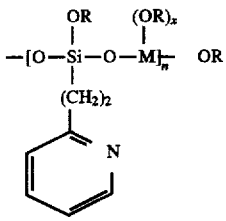

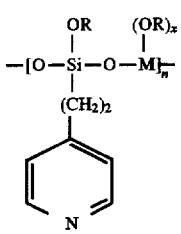

wherein the polymeric backbone is modified by a metal alkoxide, a metallocene or a metallophthalocyanine; R is $CH_3$, $C_2H_5$ or $C_3H_7$ and N is equal to or greater than 100. The metal M can be Zr, Ti, Mo, V, Hf, Nb, Si, B or mixtures thereof and x=0, 1 or 2. When the backbone of the polyorganometallosiloxanes of the present invention is modified by a metal alkoxide moiety represented by the formula $M(OR)_q$, then R is $CH_3$, $C_2H_5$ or $C_3H_7$ and q is 2, 3 or 4. The metallocene moiety is a dicyclopentadienyl metal halide of the general formula $(C_5H_5)_2 MX_{1-3}$, wherein X is chlorine, bromine or iodine. Similarly, metallophthalocynine is provided by metallophtalocyanate halides of chlorine, bromine and iodine.

The present invention also provides methods of making polyorganometallosiloxanes having a modified backbone. Methods include reacting a sol solution of β-trimethoxysilylethyl-2- or β-trimethoxysilylethyl-4- pyridine with water-soluble organic solvent solutions of a metal alkoxide, $M(OR)_q$ as previously defined, metallocenedihalide or phtalocyaninedihalidemetals under conditions of hydrolysis-condensation at from about 25° C. to about 150° C. At low temperatures of about 150° C., water soluble catalysts are required. The metal M is as previously defined in connection with the polymeric compound, namely Zr ,Ti, Al, Mo, V, Hf, Nb, Si, B and mixtures thereof. The metallocenedihalide is selected from the group consisting of metallocenedichloride, metallocenedibromide and metallocenediiodide. The phtalocyaninedihalometals are selected from the group consisting of phtalocyaninedichlorometals, phtalocyaninedibromometals, phtalcyaninediiodometals. The β-trimethoxysilylethyl-2-pyridine or α-trimethoxysilylethyl-4-pyridine and the metal alkoxide, metallocenedihalide or phtalocyaninedihalometals are in a ratio of 90:10.

As a result of the present invention, a new family of compounds which are useful as corrosion protective coatings for light weight metals such as aluminum, magnesium, zinc and their alloys including steel are provided. Additionally, inexpensive and simple methods for coating metallic substrates to provide a highly adherent corrosion protective coatings at room temperature are also provided.

Other improvements which the present invention provides over the prior art will be identified as a result of the following description which sets forth the preferred embodiments of the present invention. The description is not in any way intended to limit the scope of the present invention, but rather only to provide the working example of the present preferred embodiments. The scope of the present invention will be pointed out in the appended claims.

DETAILED DESCRIPTION OF THE INVENTION

The present invention is a new family of organometallic polymers and methods for their use as corrosion-protective coatings for light weight metal substrates. More specifically, the present invention provides pyridine-pendent siloxane polymers containing backbones modified with metal alkoxide M(OR)$_q$, metallocene

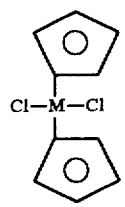

and metallophthalocyanate

Figure 1:
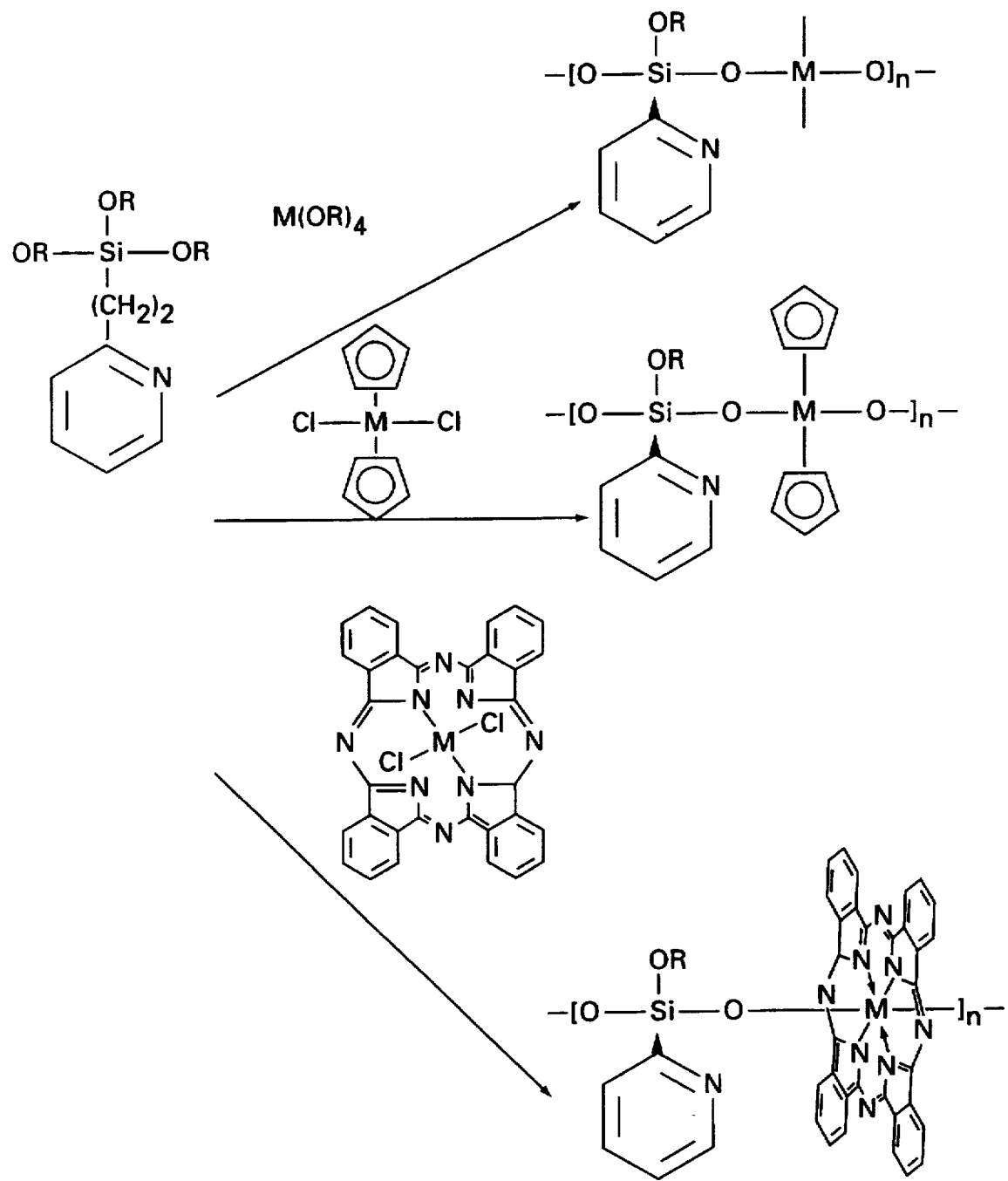
FIG. 1 shows the chemical structures of some of the starting materials and various polymers prepared according to methods provided by the present invention.

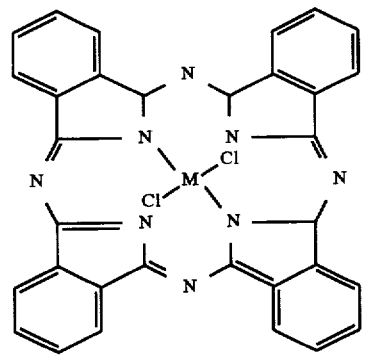

where M is Zr, Ti, Mo, V, Hf, Nb, Si, B and combinations thereof. The chemical structures for the polymers of the present invention are set forth in FIG. 1.

All compounds utilized to prepare the new organometallic polymers of the present invention can be synthesized or are readily commercially available. For example, metal alkoxides, such as titanium (IV) ethoxide, zirconium (IV) ethoxide or aluminum isoproxide are available from Alfa Products. Metallocenes, such as zirconocene chloride is available from Alfa Products, Ward Hill, Mass. 01835-0747. Phthalocyanatodichlorometals such as silicon or aluminum phathalocyanine dichloride are available from Alfa Products.

The present invention also provides methods for preparing corrosion-protective coatings including the organometallic polymers of the present invention. Pyridine-pendent siloxane polymers of the present invention contain polymeric backbone modified by metal alkoxide, metallocene or metallophthalocyanate moieties. The organometallic polymers of the present invention were synthesized by sol-gel technology, which includes a hydrolysis-condensation reaction between colloidal precursors, consisting of a network-forming monomeric β-trimethoxysilylethyl-2-or-4 pyridine (TSEP) and metal alkoxides [M(OR)$_q$] metallocene halides and metallophtalocyanatohalides wherein M is Ti, Zr, Ge, Al, B, Sn and combinations thereof, R is CH$_3$, C$_2$H$_5$ or C$_3$H$_7$ and q is 2, 3 or 4. The resulting backbone modified pyridine-pendent siloxane polymer can have many repeating monomer units such that in FIG. 1, n is equal to or greater than 100.

More specifically, pyridine-pendent siloxane polymers containing backbone modified with zirconocene (Cp$_2$Zr) moiety in terms of the polyzirconocenesiloxane-2-pyridine (PZSP) were synthesized through the hydrolysis-condensation reaction generated by mixing solutions of two phases as follows: one was a sol solution, consisting of β-trimethoxysilylethyl-2-pyridine (TSEP), water, CH$_3$OH, and HCl, and the other solution was zirconocene dichloride (Cp$_2$ZrCl$_2$) dissolved in tetrahydrofuran.

Polymetallosiloxane-2- or -4-pyridine (PMSP) were synthesized through hydrolysis-condensation reaction of specific precursor formulations. For example, to synthesize polysiloxane-2- or -4-pyridine polymers having a backbone modified by a metal alkoxide, useful precursors included TSEP and metal alkoxides, M(OR)$_q$, wherein R is CH$_3$, C$_2$H$_5$, and C$_3$H$_7$, and q is 2, 3 or 4. Polymetallocenesiloxane-2- or -4-pyridine (PMCSP) were obtained through the hydrolysis-condensation of TSEP and biscyclopentadienyl metal dichloride (Cp$_2$ MCl$_2$), also known as metallocene dichloride. Similarly, polymetallophtalocyanatesiloxane-2- or -4-pyridine (PMPSP) were obtained through the hydrolysis-condensation of TSEP and phthalocyanatodichlorometals (PCDM).

The solution of TSEP precursor is from about 2 wt % to about 10 wt % dissolved in tetrahydrofuran. The solution of $M(OR)_q$ is from about 5 wt % to about 20 wt % dissolved in tetrahydrofuran. The solution of metallocene dichloride is from about 5 wt % to about 20 wt % dissolved in tetrahydrofuran. The solution of PCDM is from about 5 wt % to about 20 wt % dissolved in tetrahydrofuran. The two phase precursor solutions can be prepared in many ratios. For example, useful ratios of TSEP:$Cp_2 MCl_2$ or TSEP:PCDM range from about 2:30 to about 98:70. Ratios of from about 90:5 to about 70:30 are preferred. Most preferred are ratios of 90:10. The hydrolysis condensation solution also includes from about 52 wt % to about 58 wt % $CH_3OH$ and from about 35 wt % to about 39 wt % water, from about 1 wt % to about 3 wt % HCl and from about 0.1 wt % to about 0.01 wt % of azo-based water soluble catalysts as described hereinbelow.

In a preferred embodiment, from about 2% by weight to about 10% by weight of monomeric β-trimethoxysilylethyl-2- or -4-pyridine (TSEP) and from about 1% by weight to about 5% by weight or metalalkoxides, $M(OR)_q$, wherein R is $CH_3$, $C_2H_5$ and $C_3H_7$ and q is 2, 3 or 4 underwent hydrolysis-condensation in from about 49 to about 58% by weight $CH_3OH$, from about 33 wt % to about 38 wt % of water, in the presence of from about 0.1 to about 0.01 wt % of azo-based catalysts over a temperature range from about 25° C. to about 150° C.

The above reactions take place at room temperature, e.g., 25° C., in the presence of azo-based water soluble catalysts. Useful catalysts are azo-based water-soluble catalysts such as 2, 2'-azobis (N, N'-dimethyleneisobutylamidine) dihydrochloride and 2, 2'-azobis (2-amidinopropane) dihydrochloride. At more elevated temperatures the reaction does not require catalysts. In the absence of catalysts, the temperature required for reaction to occur is about 150° C.

The polymeric compounds of the present invention are used as corrosion resistant coating films for substrates such as aluminum, steel, zinc, and magnesium and their alloys. A simple dip, spray or spin-coating method can be used to deposit the precursor solution layers onto the metal substrates. Heating the coated metal at temperatures from about 25° to about 150° C. for 15 to 180 minutes allows the formation of the corrosion resistant coating films of the present invention.

The focus of the examples set forth below has been to provide syntheses for corrosion resistant polyzirconocenesiloxane-2-pyridine (PZSP) coatings of the present invention. The synthesized PZSP polymers were then evaluated for use as thin coating film systems fabricated by a simple dip-withdrawing method. Five factors were analyzed and found to play an important role in ensuring that the coating films of the present invention protect aluminum alloys against NaCl-associated corrosion. These factors were: a. wettability of the aluminum surface by the mixing solution, b. susceptibility of the film surfaces to moisture, c. molecular conformation of the polymers, d. film-forming performance, and e. the chemical state at interfaces between PZSP and aluminum.

EXAMPLES

The examples below further illustrate the various features of the invention, and are not intended in any way to limit the scope of the invention which is defined in the appended claims.

1. Materials

The materials used to provide a zirconocene-modified polysiloxane-2-pyridine coating onto an aluminum alloy substrate have been synthesized as set forth below or are readily commercially available.

β-trimethoxysilylethyl-2-pyridine (TSEP) was supplied by Petrarch Systems Ltd, and bis-cyclopentadienyl zirconium dichloride (zirconocene dichloride, $Cp_2ZrCl_2$) was obtained from Alfa Products, Inc. of Ward Hill, Mass. 01835-0747. TSEP and $Cp_2ZrCl_2$ were used as the polyzirconocenesiloxane-2-pyridine (PZSP)-forming monomeric materials. The film-forming mother-liquor, which served as the precursor solution, was prepared by mixing two components: one was a sol solution consisting of 7 wt % TSEP, 55 wt % methyl alcohol, 37 wt % water, and 1 wt % HCl, and the other was a 10 wt % $Cp_2ZrCl_2$ solution dissolved in the tetrahydrofuran (THF). The composition of the five precursor solutions used herein had the following TSEP sol/$Cp_2ZrCl_2$ ratios: 100/0, 95/5, 90/10, 80/20, and 70/30 by weight.

The lightweight metal substrate used herein was 6061-T6 aluminum sheet containing the following chemical constituents: 96.3 wt % Al, 0.6 wt % Si, 0.7 wt % Fe, 0.3 wt % Cu, 0.2 wt % Mn, 1.0 wt % Mg, 0.2 wt % Cr, 0.3 wt % Zn, 0.2 wt % Ti, and 0.2 wt % other.

2. Coating Method

The deposition of PZSP films on aluminum substrates was accomplished in accordance with the following sequence of steps. First, in order to remove surface contaminants the aluminum substrates were immersed for 20 minutes at 80° C. in an alkaline solution of 0.4 wt % NaOH, 2.8 wt % tetrasodium pyrophosphate, 2.8 wt % sodium bicarbonate, and 94.0 wt % water. The alkali-cleaned aluminum surfaces were then washed with deionized water at 25° C. for 5 minutes, and dried for 15 minutes at 100° C. The substrates were then dipped into a soaking bath of precursor solution at room temperature, and withdrawn slowly. The wetted substrates were heated in an oven for 120 minutes at either 100°, 150°, or 200° C., to yield thin solid films. A rough estimate of thickness of coating films prepared by dip-withdrawing coating process was obtained by scanning electron microscopy of the interfacial cross-section areas of the coated aluminum substrates. The thickness of coating films obtained by gravitational draining was somewhat uneven ranging from about 0.5 to about 1.0 μm.

3. Measurements

The surface tension of the single and mixed precursor solutions was measured with a Cenco-DuNouy Tensiometer Model 70535. The data thus obtained was then related to the wettability values of the aluminum (Al) surface by the precursor solutions. Wettability was determined by measuring the contact angle within the first 30 seconds after dropping precursor solutions on aluminum surfaces. Similar measurements of the contact angle were made to evaluate the susceptibility to moisture of PZEP coated film surfaces at 100°, 150°, and 200° C. Changes in the contact angle were made by dropping water onto the surfaces of the coating films.

Several important parameters such as polymer conformation, microstructure development, and chemical composition and state at the PZSP/Al interfaces, were evaluated by using specular reflectance fourier transform infrared (FTIR) spectrophotometry, scanning electron microscopy (SEM), energy-dispersion x-ray (EDX) spectroscopy, and x-ray photoelectron spectroscopy (XPS).

Alternate current (a.c.) electrochemical impedance spectroscopy (EIS) was used to evaluate the ability of coating films to protect the aluminum substrate from corrosion. The specimens were mounted in a holder, and then inserted into an electrochemical cell. Computer programs were prepared to calculate theoretical impedance spectra and to analyze the experimental data. Specimens having a surface area of 13 cm$^2$ were exposed for up to 40 days to an aerated 0.5N NaCl electrolyte at 25° C. and single-sine technology with an input a.c. voltage of 10 mV (rms) were used over a frequency range of 10 KHz to 1 mHz. To estimate the protective performance of coatings, the pore resistance ($R_{po}$) was determined from the plateau in Bode plot scans (impedance (ohm-cm$^2$) vs. frequency (Hz)) which occurred at low frequency regions. Salt-spray tests of PZSP-coated aluminum panels were performed in accordance with ASTM B 117, using a 5% NaCl solution at 35° C.

4. Characteristics of Coating Films
  a. Wettability of Coated Surfaces

TABLE 1

Relationship between surface tension and contact angle for various different TSEP/Cp$_2$ZrCl$_2$ solution ratios on Al substrate.

| TSEP/Cp$_2$ZrCl$_2$ (ratio) | Surface tension (dynes cm$^{-1}$) | Contact angle, θ (degree) |
|---|---|---|
| 100/0 | 35.5 | 35.9 |
| 95/0 | 35.1 | 28.8 |
| 90/10 | 34.7 | 23.1 |
| 80/20 | 34.2 | 18.5 |
| 70/30 | 33.9 | 13.3 |

Table 1 shows the changes in surface tension of the precursor solutions used to prepare the above coating films as a function of TSEP/Cp$_2$ZrCl$_2$ ratio at 25° C., and also their contact angle on an aluminum substrate. The addition of water-soluble Cp$_2$ZrCl$_2$ solution to the TSEP sol improved wettability by decreasing the surface tension, from 35.5 dynes/cm for the single TSEP sol in the absence of Cp$_2$ZrCl$_2$, to 33.9 dynes/cm for a 30 part Cp$_2$ZrCl$_2$ incorporated with the TSEP sol. As expected, the decreasing surface tension of solution corresponded to a reduction of the contact angle. Liquids with a low surface tension were expected to have a good wetting behavior on solid surface, namely, a decrease in the TSEP/Cp$_2$ZrCl$_2$ ratio was reflected in a drop in surface tension, and also resulted in an increase in wettability of the aluminum surface by precursor solutions. Compared with a TSEP sol, a mixed solution with Cp$_2$ZrCl$_2$ and TSEP appeared to promote significantly the spreadability of precursor solutions over the substrate surfaces.

b. Susceptibility of Coated Surfaces to Moisture

One important factor which is indispensable for good protective coating systems is good hydrophobic characteristics. To obtain information on this characteristic, the contact angle of a water droplet was measured on PZEP coated surfaces treated at 100°, 150°, and 200° C. For instance, if the contact angle was low the coating film was considered to be susceptible to moisture. A high degree of moisture susceptibility can allow hydrolytic decomposition of the coating film and water penetration through the coating layers.

Figure 2:
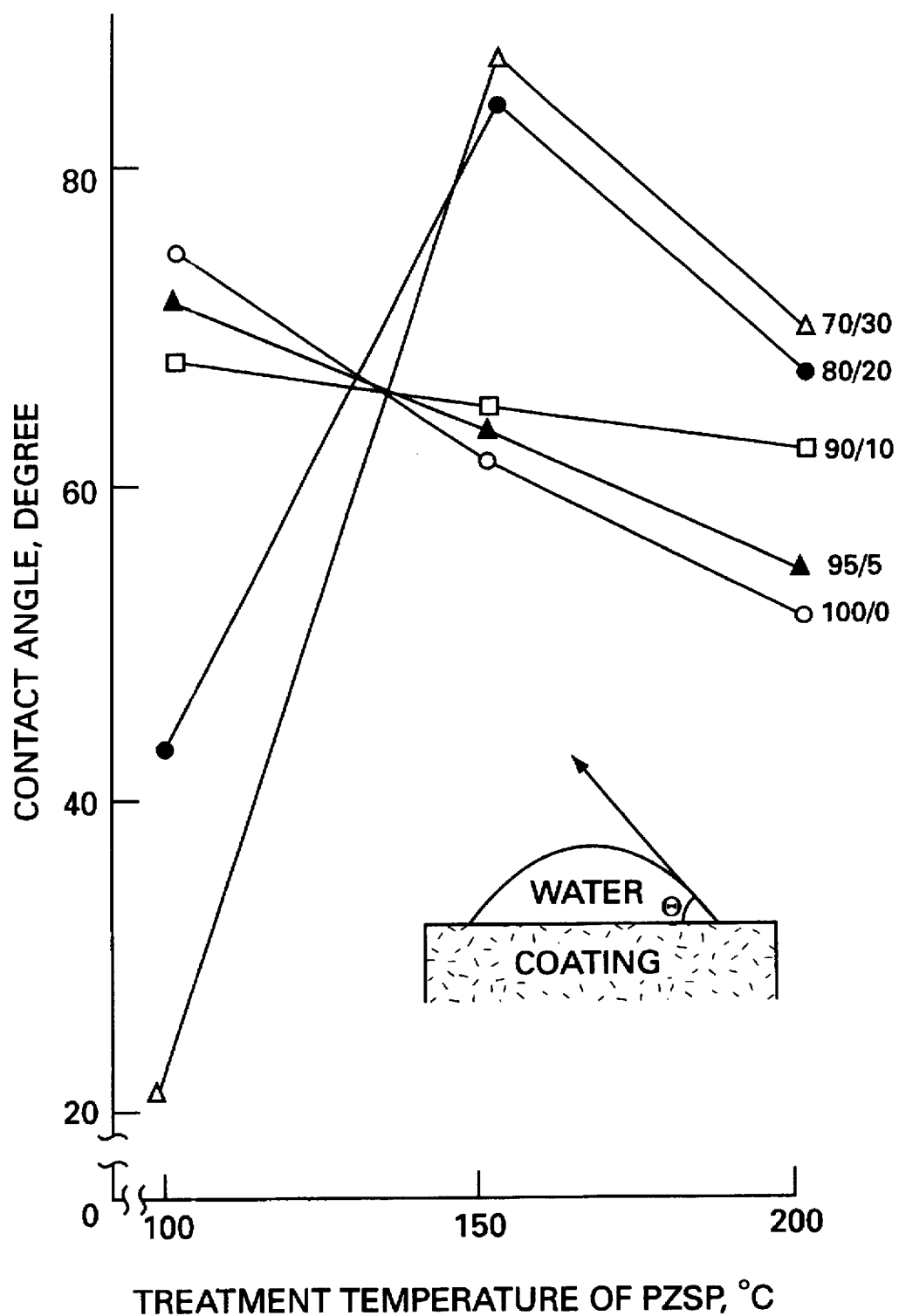
FIG. 2 illustrates changes in contact angle of film surfaces covered with coatings made from precursor solutions having different TSEP/Cp$_2$ZrCl$_2$ ratios as a function of temperature.

A plot of contact angles against changes in treatment temperature of PZSP coating films is shown in FIG. 2. The data set forth in FIG. 2 indicates that the main factor which determined the size of the contact angle was not temperature dependence but the amount of Cp$_2$ZrCl$_2$ mixed with the TSEP. A decrease in TSEP/Cp$_2$ZrCl$_2$ ratio resulted in a lowering of contact angle which corresponded to a high degree of wettability of the coating film surface. Thermal treatment of films at 150° C. provided an unexpected result, namely, the contact angle of coating film surfaces made with a low ratio of TSEP/Cp$_2$ZrCl$_2$ was conspicuously raised. Contact angles of >80° were obtained from surfaces coated with coating films having ratios of 70/30 and 80/20 of TSEP/CpZrCl$_2$. These values more than doubled when the same films were exposed at 100° C. In contrast, surfaces coated with coating films having a high ratio of TSEP/Cp$_2$ZrCl$_2$ showed a reduced contact angle. In fact, a surface coated with a film which was not modified with Cp$_2$ZrCl$_2$ showed the highest value for the contact angle at 100° C. A surface coated with a Cp$_2$ZrCl$_2$ modified coating film in a 70:30 TSEP/Cp$_2$ZrCl$_2$ ratio had the lowest contact angle at 100° C. However, a further increase in temperature to 200° C. led to a drop in contact angle for all specimens both modified and unmodified with Cp$_2$ZrCl$_2$. This data indicated that a combination of two factors, a certain TSEP/Cp$_2$ZrCl$_2$ ratio and an appropriate temperature generated PZSP coated film surfaces with minimum wetting properties and, therefore, good hydrophobic characteristics. The data also illustrated that the lowest rate of variation in contact angle at temperatures ranging from 100° to 200° C. was obtained for a surface coated with a film having a 90/10 ratio of TSEP/Cp$_2$ZrCl$_2$. Thus, as a result of good hydrophobic characteristics, coated film surfaces of the invention have not shown significant susceptibility to moisture.

c. Molecular Conformation of Polymers in Coating Films

To understand the chemical conformation of PZSP coating films and the thermal transformation which caused a high and low extent of water wetting, precursor solutions having various TSEP/Cp$_2$ZrCl$_2$ ratios were deposited on aluminum surfaces by dip-withdrawal coating methods. The coated surfaces were then exposed to 100°, 150°, and 200° C. in order to transform them into solid coating films which were analyzed by FTIR spectroscopy. In order to gain a better understanding of the chemical changes during liquid-solid transition processes occurring in the PZSP films, FTIR spectra were also taken of its precursors.

Figure 3:
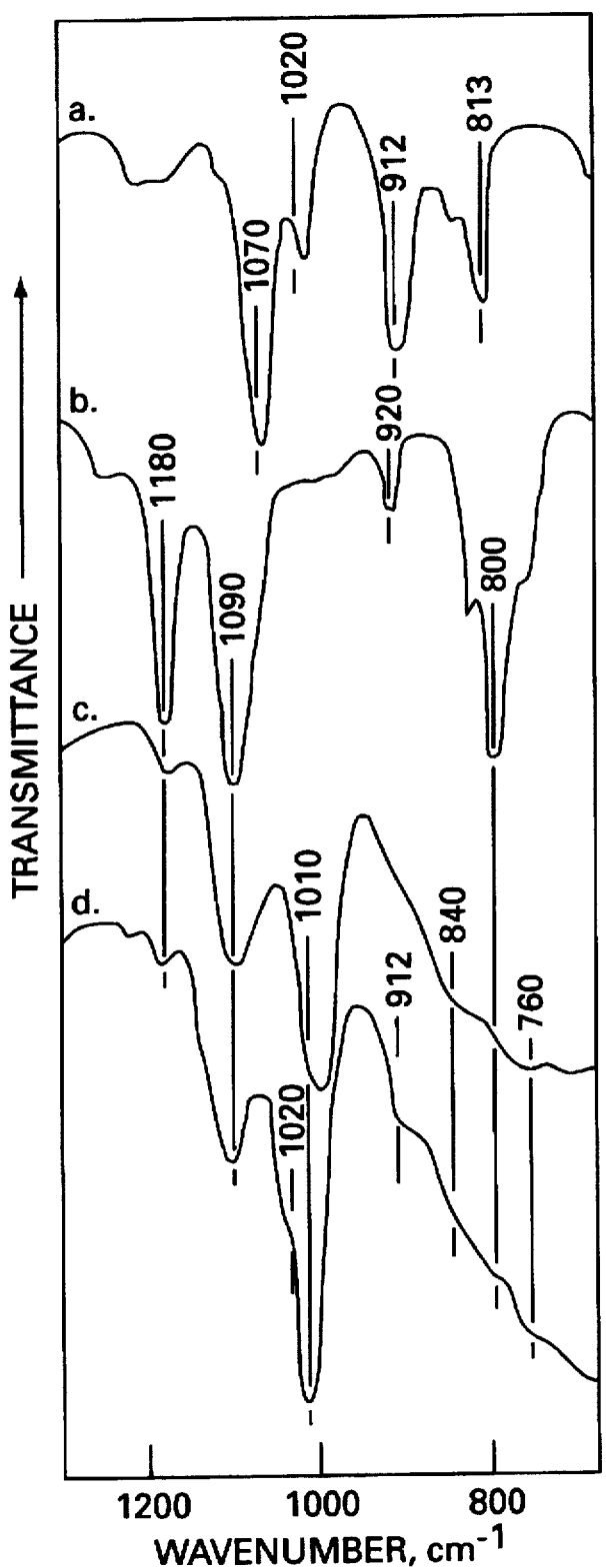
FIG. 3 shows FTIR spectra as follows: THF-dissolved Cp$_2$ZrCl$_2$ at (a), "as-received" TSEP at (b), HCl-catalyzed TSEP solution at bearing no Cp$_2$ZrCl$_2$ at (c), and a mixed solution of TSEP/Cp$_2$ZrCl$_2$ in a ratio of 70/30 at (d)

FIG. 3 depicts the FTIR spectra over frequency ranges from 1300 to 700 cm$^{-1}$ as follows: tetrahydrofuran solution of Cp$_2$ZrCl$_2$ at (a); "as-received" TSEP at (b); a single HCl-catalyzed TSEP precursor denoted as a TSEP/Cp$_2$ZrCl$_2$ ratio of 100/0 at (c); a mixed precursor of 70/30 ratio TSEP/Cp$_2$ZrCl$_2$ at (d). Spectrum (a) of THF-dissolved Cp$_2$ZrCl$_2$ solution showed absorption bands at 1070 and 912 cm$^{-1}$, which can be ascribed to C-O vibration in the THF rings. Other absorption bands observed at 1020 and 813 cm$^{-1}$ were ascribed to the Cp$_2$ZrCl$_2$. FTIR absorption spectrum of TSEP at (b) showed absorption bands at 1180, 1090, and 920 cm$^{-1}$, belonging to the Si-ethoxide compound. Bands observed at 800 cm$^{-1}$ indicated the presence of pyridine rings in TSEP. By comparison with that of the reference sample denoted as "b", the spectra features of the HCl-catalyzed single TSEP precursor shown at (c) were characterized by a remarkable loss of peak intensities at 1180, 1090, and 920 cm$^{-1}$ as originating from the Si-ethoxide compounds and the appearance of new bands at the frequency locations of 1010, 840, and 760 cm$^{-1}$. Possible contributors to the newly developed bands at 1010 and 760 cm$^{-1}$ were the asymmetric and symmetric stretching vibrations of siloxane groups, Si-O-Si, respectively. (Ferraro, J. R., et al., *Phys. Chem. Glass*, 13, 116 (1972); Uchino, T., et al, *J. Am. Ceram. Soc.*, 74, 306 (1991)) The additional band at 840 cm$^{-1}$ indicated the formation of both OH bending and Si-O stretching modes in silanol, Si-OH, groups. Relating this fact to the elimination of the Si-ethoxide groups, it can be assumed that SiOH groups were formed by the HCl-catalyzed hydrolysis reaction of Si-ethoxide groups. Thus, the finding of SiOH groups indicated that the dehydration-condensation reactions between neighboring silanol groups found on TSEP lead to the colloidal dispersion of polysiloxanes with pendent pyridine groups in the liquor solution. A spectrum similar to that of a single TSEP precursor, except for the vibration made by some $Cp_2ZrCl_2$ bands, was observed by using precursor solutions having a $TSEP/Cp_2ZrCl_2$ ratio of 70/30 as shown at (d). However, there were no notable bands near 970 cm$^{-1}$, corresponding to the typical vibration mode of Si-O-M linkages, wherein M is a metal as defined above. Hence, it is apparent that whether or not the TSEP was modified by the $Cp_2ZrCl_2$, the sols formed in the precursor solution had a certain degree of Si-O-Si linkages but no Si-O-Zr linkages.

Figure 4:
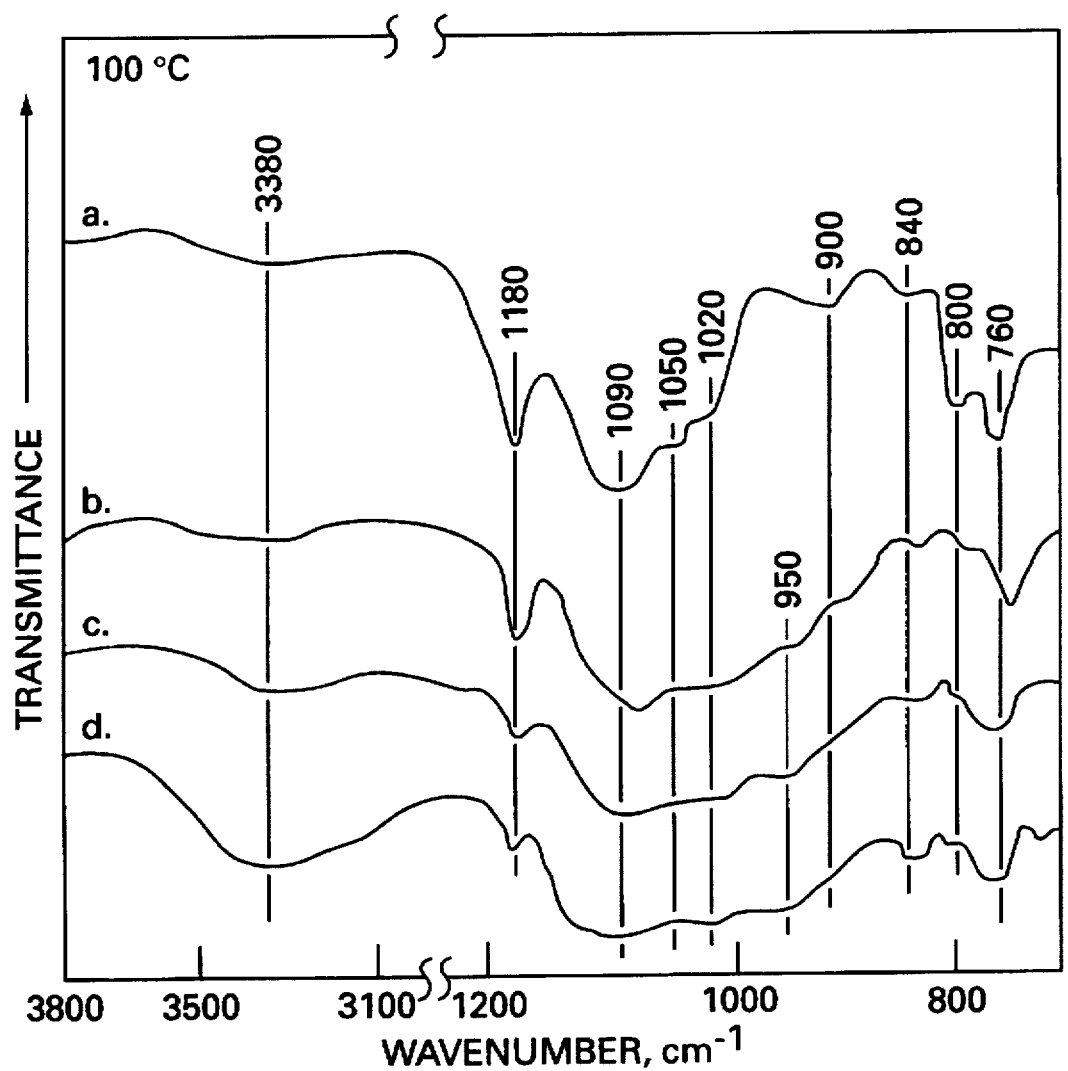
FIG. 4 illustrates FTIR spectra for PZSP film coatings onto aluminum substrates obtained from solutions having TSEP/Cp$_2$ZrCl$_2$ ratios of 100/0 at (a), 90/10 at (b), 80/20 at (c), and 70/30 at (d) all treated at 100° C.

These spectra were directly compared with those taken from solid coating films prepared by thermal treatment of the precursors deposited onto the substrate surfaces at 100°, 150°, and 200° C. FIG. 4 illustrates IR spectra for PZSP coatings obtained from coating solutions treated at 100° C. and having $TSEP/Cp_2ZrCl_2$ in the ratios of 100/0 at (a), 90/10 at (b), 80/20 at (c), and 70/30 at (d) over two frequency ranges, 3800 to 3100 cm$^{-1}$, and 1300 to 700 cm$^{-1}$. FIG. 4(a) illustrates no particular spectral features for a coating having a 100/0 $TSEP/Cp_2ZrCl_2$ ratio. Absorption bands were present at 3380 and 840 cm$^{-1}$ for the SiOH hydrolysates, at 1180, 1090, 1050, and 900 cm$^{-1}$ for the non-hydrolytic Si-ethoxide groups, at 1020 and 760 cm$^{-1}$ for the Si-O-Si linkages, and at 800 cm$^{-1}$ for the pyridine rings. When TSEP was modified with $Cp_2ZrCl_2$ as shown in FIG. 4 at (b), (c) and (d) an additional band occurred at a frequency position of 950 cm$^{-1}$ which band indicated the formation of Si-O-Zr linkages. The formation of this linkage was clearly the result of formation of a polysiloxane-2-pyridine containing a backbone with a $Cp_2Zr$ moiety.

It is well known that many organometallic halides are rapidly hydrolyzed to form hydroxides or oligomeric polyoxides after exposure to water. Thus, when $Cp_2ZrCl_2$ was incorporated into the TSEP in an aqueous medium, the hydroxylation of the Zr-Cl end groups promoted dehydrochlorination as means of scavenging HCl, which then lead to the formation of $Cp_2Zr(OH)_2$, thereby forming Si-O-Zr linkages in the dehydrating condensation reaction between the SiOH end groups in siloxane and the hydroxyl groups in $Cp_2Zr(OH)_2$ at 100° C. as follows:

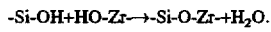

-Si-OH+HO-Zr-→-Si-O-Zr-+H$_2$O.

The data also indicated that the intensity of the Si-O-Zr absorption band tended to grow with an increase in proportion ratio of TSEP to $Cp_2ZrCl_2$. This finding indicated that the degree of densification of Si-O-Zr linkages depended mainly on the amount of $Cp_2ZrCl_2$ added to the TSEP; a PZSP conformation with highly dense Si-O-Zr linkages was derived from precursors with a low value for the $TSEP/Cp_2ZrCl_2$ ratio. Furthermore, the intensity of the band at 3380 cm$^{-1}$ also increased with increase of $Cp_2ZrCl_2$ in the $TSEP/Cp_2ZrCl_2$ ratio. Since this bond not only belonged to the Si-OH hydrolysate, but also to the Zr-OH hydrolysate, it is believed that the addition of a large amount of $Cp_2ZrCl_2$ to the TSEP caused unconverted ZrOH groups to be left into the PZSP. Thus, without being bound by theory, it is believed that, the affinity of polar ZrOH moieties for moisture was the major reason why PZSP films with a low $TSEP/Cp_2ZrCl_2$ ratio had a high degree of wettability.

Figure 5:
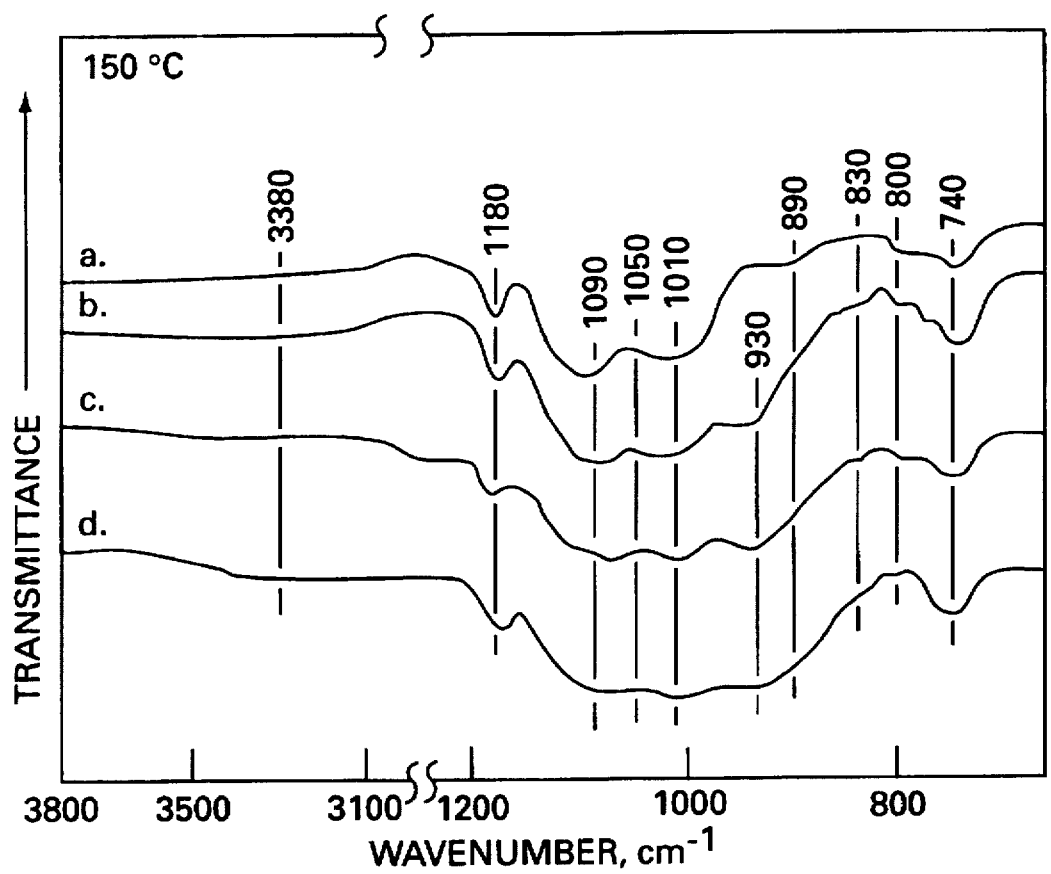
FIG. 5 illustrates FTIR spectra for Al surfaces coated with precursor solutions having PSEP/Cp$_2$ZrCl$_2$ ratios of 100/0 at (a), 90/10 at (b), 80/20 at (c), and 70/30 at (d) all treated at 150° C.

In FIG. 5 coated films treated at 150° C. showed two noticeable differences in FTIR spectral features as compared to FTIR spectra taken of coated films treated at 100° C. as shown in FIG. 4. First, there was an increase in intensity of Si-O-Si and Si-O-Zr linkages-related bonds at 1010 and 930 cm$^{-1}$, respectively, with a considerable reduction in the intensity of the Si-ethoxide band at 1090 cm$^{-1}$. Second, a striking decay was observed of absorption bands at 3380 and 830 cm$^{-1}$, belonging to the Si-OH and Zr-OH hydrolysates. These results indicated that the number of Si-O-Si and Si-O-Zr linkages induced from the condensation reaction between the Si-OH and Zr-OH hydrolysate and Si-ethoxide, and the hydrolysate themselves, increased when the coating films were treated at 150° C. It is believed that the reasons for minimum susceptibility to moisture of film surfaces coated with coating having a low $TSEP/Cp_2ZrCl_2$ ratio was due to two important factors: one factor was the elimination of hydrolysate from the coatings, and the other factor was the incorporation of more $Cp_2Zr$ moieties into the siloxane backbones. The latter factor, which was related directly to the proportion of Si-O-Si to Si-O-Zr linkages, also explained why a high ratio of $TSEP/Cp_2ZrCl_2$ caused an increase in the extent of water-wettability of the film surfaces. In fact, the contact angle of PZSP film surfaces covered by water became low if the amount of $Cp_2ZrCl_2$ fell below a certain level as is illustrated in FIG. 2.

Figure 6:
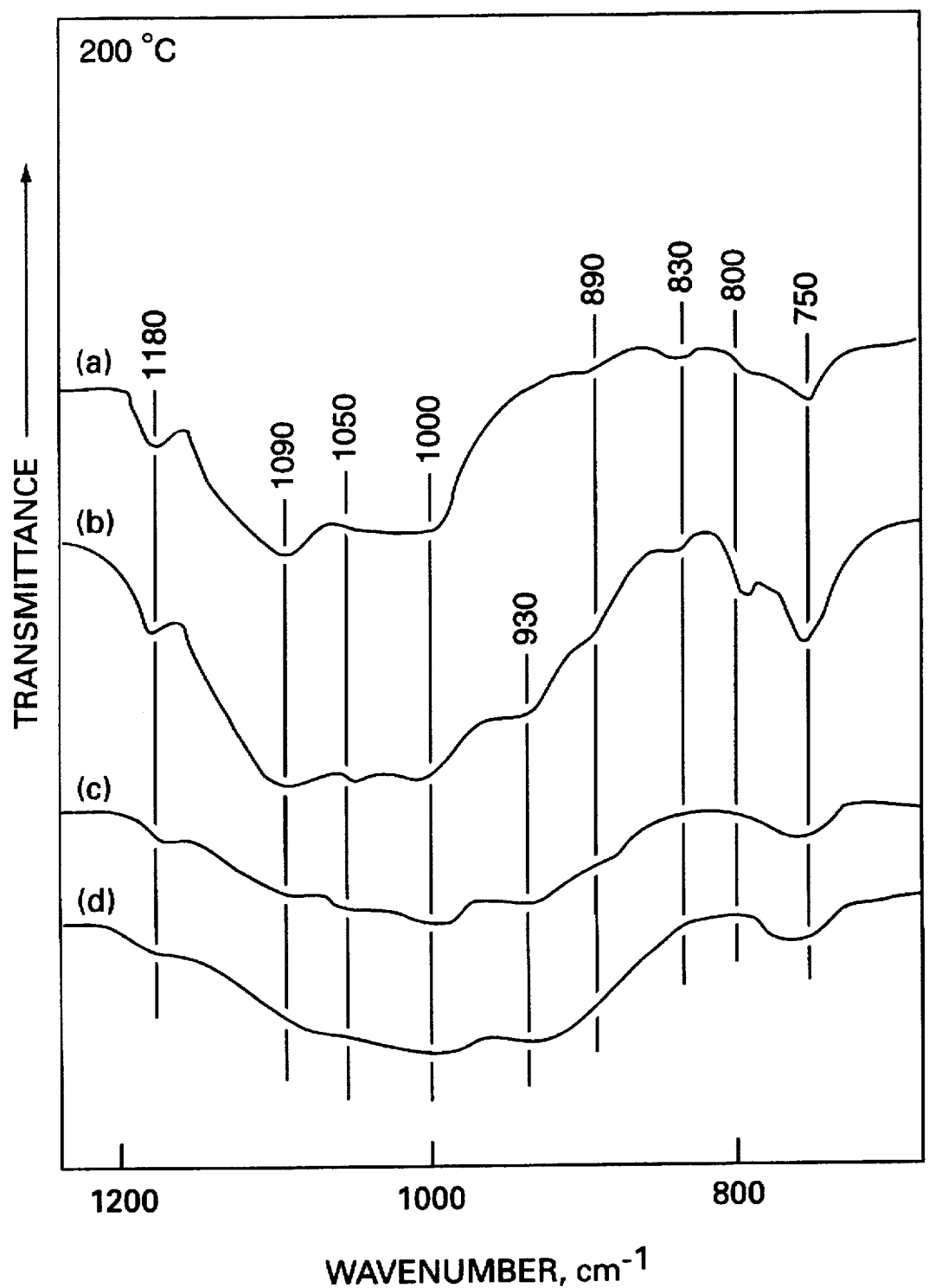
FIG. 6 shows FTIR spectra for Al surfaces coated with precursor solutions having TSEP/Cp$_2$ZrCl$_2$ ratios of 100/0 at (a), 90/10 at (b), 80/20 at (c), and 70/30 at (d) all treated at 200° C.
Figure 7A:
FIG. 7 shows SEM-EDX examination results for Al surfaces coated with precursor solutions having TSEP/Cp$_2$ZrCl$_2$ ratios of 100/0 at (a), 80/20 at (b), and 70/30 at (c) all treated at 150° C.
Figure 7A:
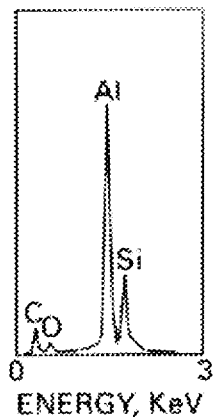
Figure 7B:
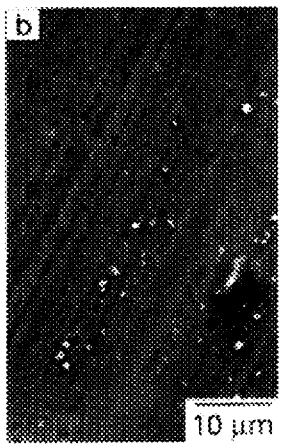
Figure 7B:
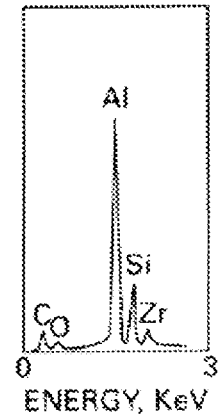
Figure 7C:
Figure 7C:
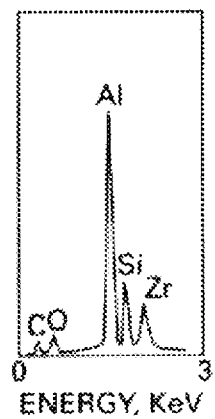

The FTIR spectral features of films treated with $Cp_2ZrCl_2$ at 200° C. as illustrated in FIG. 6 closely resembled those of films treated at 150° C., except for a slight decrease in the intensity of Si-ethoxide group-related bands at 1180, 1090, and 1050 cm$^{-1}$. The elimination of Si-ethoxide groups corresponded to an increase in densification of Si-O-Si and Si-O-Zr linkages.

d. Film Forming Performance

In FIG. 7 SEM surface images accompanied by EDX spectra are shown for films treated at 150° with $TSEP/Cp_2ZrCl_2$ in ratios of 100/0, 80/20, and 70/30. No specific feature can be seen on the SEM images of the film surfaces with $TSEP/Cp_2ZrCl_2$ ratios of 100/0 at (a) and 80/20 at (b); the aluminum surfaces were covered with a smooth, continuous film. In contrast, the microtexture of film shown at (c) derived from a 70/30 $TSEP/Cp_2ZrCl_2$ ratio of precursors, disclosed the development of several microcracks. Relating this fact to the information on the changes in PZSP conformation obtained from FTIR, the development of such fissures was associated with the degree of densification of Si-O-Zr linkages. The presence of very dense Si-O-Zr linkages can generate in-situ stress by the shrinkage of film, which explained the development of microcracks as observed by SEM microprobe.

The EDX spectrum together with the SEM micrograph, for the 100/0 ratio film without $Cp_2ZrCl_2$, indicated a dominant line of aluminum, a moderate line of Si, and weak lines for C and O elements. Because EDX is useful for the quantitative analysis of elements which exist on a subsurface layer up to ≈1.5 μm in thickness, the aluminum line belonged to the underlying substrate, while the presence of Si, C, and O elements was assignable to the PZSP film. A line for N elements in the pyridine rings was too weak to be detected near 0.4 KeV. Also, there was no signal detected for Cl element (≈2.6 KeV), corresponding to the HCl used as the catalyst for the hydrolysis-condensation reaction of TSEP. As expected, the EDX spectrum of a film having a 80/20 $TSEP/Cp_2ZrCl_2$ ratio had an emerging Zr signal at ≈2.0 KeV. There was, however, no clear evidence for the presence of Cl originating from the $Cp_2ZrCl_2$. A further increase in the amount of $Cp_2ZrCl_2$ in the precursor systems resulted in a growing intensification of the Zr line. This result was observed on the EDX spectrum of the 70/30 $TSEP/Cp_2ZrCl_2$ ratio film of FIG. 7(c). As a result, the use of an appropriate TSEP/Cp$_2$ZrCl$_2$ ratio is critical in generating a good PZSP coating film over an aluminum surface.

e. Chemical State and Bond Structure at Interface

The chemical state and bond structure at interfaces between the PZSP and the aluminum surface was studied by XPS. In preparing the samples, coating films having an 80/20 TSEP/Cp$_2$ZrCl$_2$ ratio and treated at 100° C. were removed from the aluminum surfaces by immersing the samples in acetone, followed by rinsing with deionized water. The aluminum side which was devoid of any coating film was then dried for one hour in N$_2$ gas at 100° C. prior to XPS analysis. Two reference samples were also employed, an alkali-cleaned aluminum and an aluminum surface coated with a coating having a ratio of 80/20 Cp$_2$ZrCl$_2$ and treated at 100° C. Table 2 below shows the surface chemical composition and atomic ratio of these samples.

Because Si and N atoms came directly from the TSEP, the data indicated that pyridine-pendent siloxane groups precipitated preferentially on the aluminum surface, rather than the Cp$_2$Zr moiety in the siloxane backbone structure.

A comparison of the difference in the Si/N ratio of 2.24 for bulk PZSP versus 1.95 for the interface was also of interest. The number of N atoms adjacent to the aluminum were appreciably higher than the number of Si atoms, indicating that the N in the pendant pyridine groups had an affinity for the Al$_2$O$_3$ layers existing at the outermost surface site of the aluminum substrate. Thus, characteristics of the pyridine nitrogen were explored because it is believed that the pyridine nitrogen can play an important role in promoting the linkage between the PZSP and Al$_2$O$_3$ at atomic level.

Figure 8:
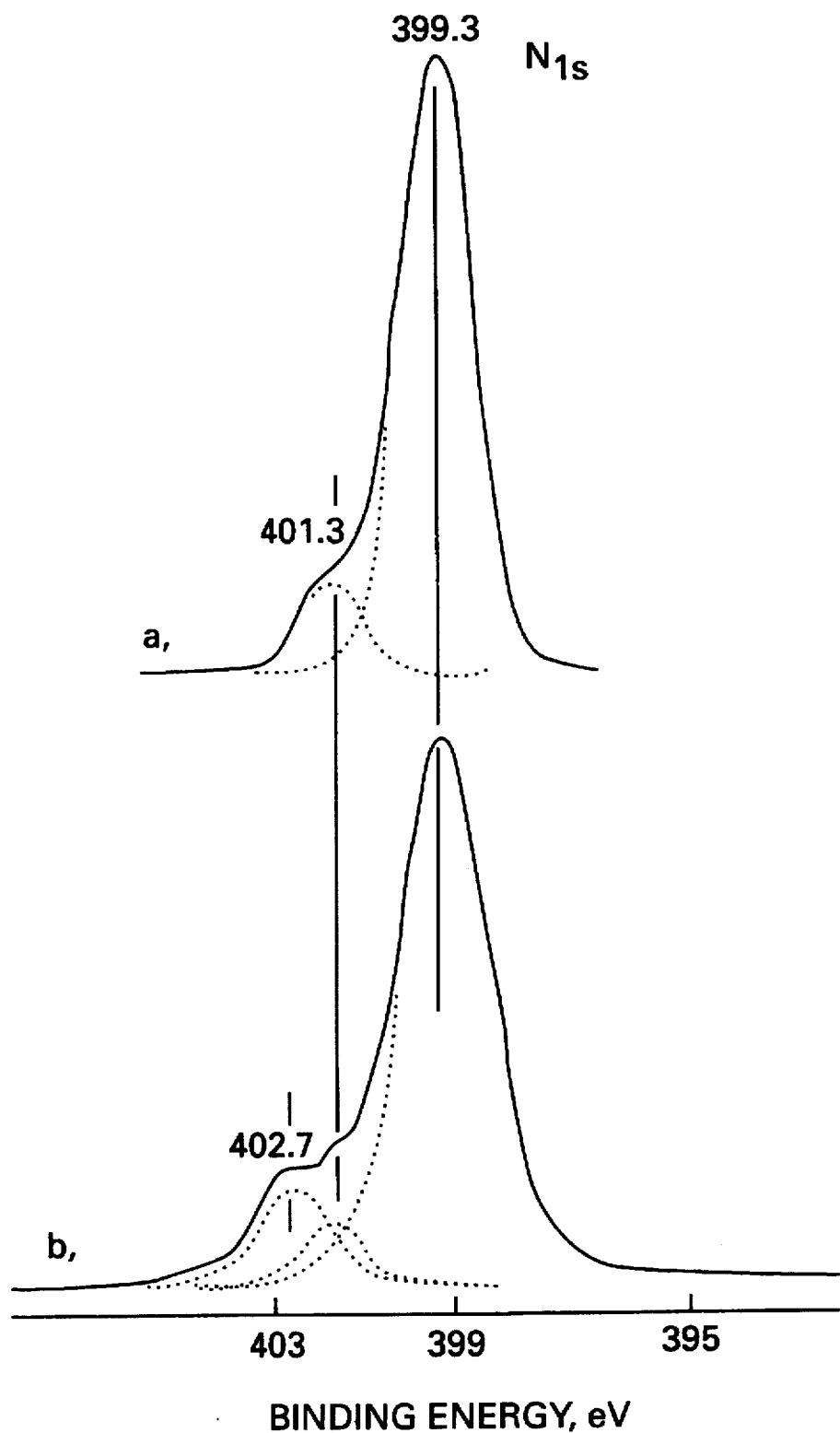
FIG. 8 illustrates XPS of N$_{1s}$ core-level spectra for bulk PZSP surface at (a) and Al substrate-PZSP interface at (b)

To obtain information on linkage between PZSP and Al$_2$O$_3$, the XPS of N$_{1s}$ core-level spectrum exciting at the PZSP-Al interfaces as shown in FIG. 8 was explored. By way of comparison, the surface of the bulk PZSP coating

TABLE 2

XPS surface chemical composition and atomic ratio for alkali-cleaned Al, bulk PZSP, and interfacial Al removed from PZSP

| Surface | Atomic composition, % | | | | | | | Atomic ratio | | |
|---|---|---|---|---|---|---|---|---|---|---|
| | Al | Si | C | O | Cl | Zr | N | ZR/Si | ZR/N | Si/N |
| Al | 24.01 | 6.66 | 19.33 | 50.00 | — | — | — | — | — | — |
| PZSP | — | 11.90 | 55.08 | 21.13 | 2.11 | 4.46 | 5.32 | 0.38 | 0.84 | 2.24 |
| Interfacial Al | 16.28 | 6.70 | 41.29 | 29.45 | 1.36 | 1.50 | 3.43 | 0.22 | 0.44 | 1.95 |

The quantitative data for the individual elements as set forth in Table 2 above were estimated by comparing the XPS for Al$_{2p}$, Si$_{2p}$, C$_{1s}$, O$_{1s}$, Cl$_{2p}$, Zr$_{3d5/2}$, and N$_{1s}$ peak areas, which then were converted into the atomic concentrations by using the differential cross sections for core-level excitation. The surface of alkali-cleaned aluminum had 24.01% Al, 6.66% Si, 19.33% C, and 50.00% O by weight. The Al and O atom peaks belonged mainly to the formation of Al$_2$O$_3$. The chemical state of Si was identified by the binding energy of the peak position emerging in the Si$_{2p}$ core-level region. All binding energies is measured in this study were calibrated with the C$_{1s}$ of the principal hydrocarbon-type C peak fixed at 285.0 eV as an internal reference standard. The Si$_{2p}$ region, not shown in Table 2 was indicative of the presence of a major peak at 99.0 eV, corresponding to elemental Si which can come from the aluminum. C was identified as a contaminant.

XPS is commonly used to identify the chemical states for superficial layers at the penetrating depth of photoelectron, namely, from 50 to 500 nm. Thus, although there was no clear evidence of Cl from the EDX inspection, XPS reveled 2.11% Cl at the outermost surface side of the PZSP film. The PZSP film was removed from the aluminum surface which had been coated with PZSP. The data showed that some residual PZSP film adhering to the aluminum was thin enough to cause a photoemission signal from the underlying aluminum surface. In fact, Al, Si, and some O atoms originated from the aluminum substrate. Thus, the thickness of the residual PZSP film could be no more than 500 nm.

Other atoms, such as Si, C, O, Cl, Zr, and N appeared to be associated with the PZSP coating film. Emphasis was placed on comparing the Zr/Si, Zr/N, and Si/N atom ratios of the bulk PZSP surface and the interfacial aluminum surface removed from PZSP. The Zn/Si and Zr/N ratios of the latter sample were lower than those of the bulk PZSP.

film was investigated as the reference spectrum. The vibration curve for the PZSP reference spectrum shown at FIG. 8 (a) revealed two resolvable Gaussian components at the bond energy position of 399.3 eV as the major line, and at 401.3 eV as the minor line. The former peak was assigned to the double bonded nitrogen present in a conjugated pyridine ring structure. (Baker, et al, *J. Chem. Soc. Faraday Trans. II*, 69, 551 (1973). A weak peak at 401.3 eV was assigned to N originating from the formation of pyridine hydrochloride. (Nordberg, R., et al., *Arkiv. Kemi.*, 28 257 (1968); Baybutt, P., et al., *Molec. Phys.*, 25, 1011 (1973)) Based on this interpretation, pyridine nitrogen favorably reacted with both the HCl catalyst used in promoting the hydrolysis of TSEP, and the HCl by product formed by the hydroxylating reaction of the Zr-Cl end groups in Cp$_2$ZrCl$_2$. This finding was used to explain why a certain amount of Cl was detected on the PZSP surfaces by XPS. In contrast, the N$_{1s}$ region of interfacial aluminum side at FIG. 8(b) showed the emergence of an additional peak at 402.7 eV, together with an existing weak signal of pyridine hydrochloride at 401.3 eV. This new peak corresponded to a shift of 3.4 eV to a high bonding energy (BE) position from that of the pyridine nitrogen. The peaks at the BE position of >402 eV were assigned to oxidized nitrogen groups such as —NO, —ONO, and —NO$_2$. (Hendrickson, D. N., et al., *Inorg. Chem.*, 8, 2642 (1969)) The position of the binding energy of these groups increased with an increase in the oxidizing rate of nitrogen. The additional information that the nitrogen atom in the ring structure strongly chemisorbed on partially oxidized metal surfaces indicated that N in the -N-O- linkage was formed by the interaction between the pyridine N and the oxygen in Al$_2$O$_3$ substrate. Scheme 1 below shows the interfacial bond structure occurring in coating films prepared according to the present invention.

Scheme 1

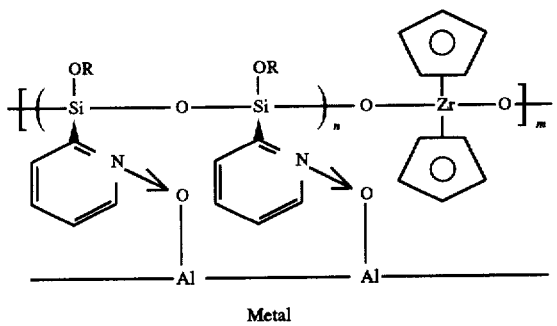

Metal

5. Corrosion Resistance

All information described above was correlated directly to results obtained from electrochemical impedance spectroscopy (EIS) and salt-spray resistance for aluminum substrates coated with coating films prepared at 150° C. and having TSEP/$Cp_2ZrCl_2$ ratios of 100/0, 90/10, 80/20, and 70/30. The salt-spray resistance was measured as a function of exposure times up to 40 days in a 0.5N NaCl solution at 25° C.

Figure 9:
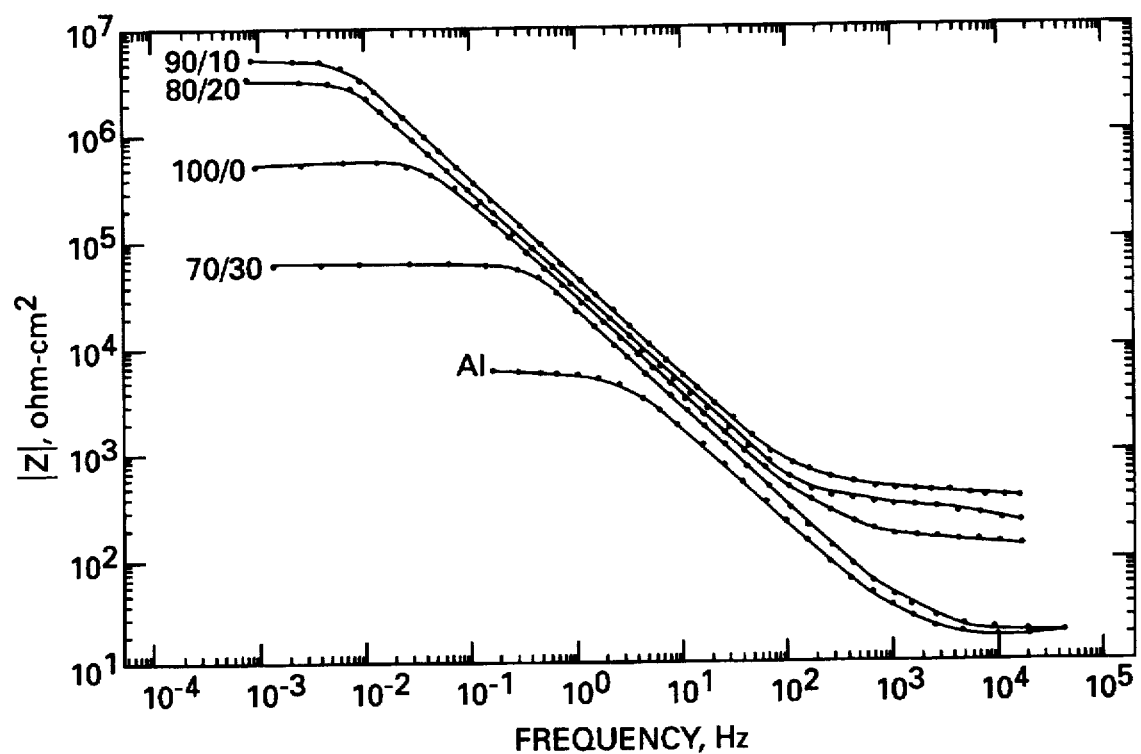
FIG. 9 shows Bode plots for bare Al substrate and coated Al specimens.

FIG. 9 compares the Bode plot features by showing the absolute value of impedance, $|Z|$ prepared in ohm-$cm^2$ vs. frequency measured in Hz of these specimens before exposure. The impedance value of the element $|Z|$ was determined from the plateau in the Bode plot occurring at sufficiently low frequencies. The impedance of the uncoated aluminum substrate was approximately equal to $5.0 \times 10^3$ ohm-$cm^2$ at a frequency of 0.5 Hz. Once the aluminum surfaces were coated with the PZSP, the impedance expressed in terms of the pore resistance, $R_{po}$, of the coatings increased by one or two orders of magnitude over that of the substrate. As illustrated in FIG. 9 the $R_{po}$ values reflected the magnitude of ionic conductivity generated by the electrolyte passing through the coating layers; namely, a high value of $R_{po}$ reflects a low degree of penetration of electrolyte into the coating film. The data illustrated in FIG. 9 shows that the magnitude of conductivity depended upon TSEP/$Cp_2ZrCl_2$ ratio of precursors used to make the coating films of the present invention. A comparison of $R_{po}$ values at $3 \times 10^{-3}$ Hz for coatings containing TSEP/$Cp_2ZrCl_2$ precursors indicated that the effectiveness of ensuring a low degree of penetration of salt electrolyte was in the following order: 90/10>80/20>100/0>70/30 TSEP/$Cp_2ZrCl_2$. The lowest value of $R_{po}$ for the 70/30 ratio-derived coating film is probably associated with the presence of microcracks developed in the film layers, thereby resulting in a poor protective performance. In contrast, the 90/10 and 80/20 ratio-coated aluminum showed an ionically inert behavior, corresponding to a $R_{po}$ of $>10^6$ ohm-$cm^2$.

Figure 10:
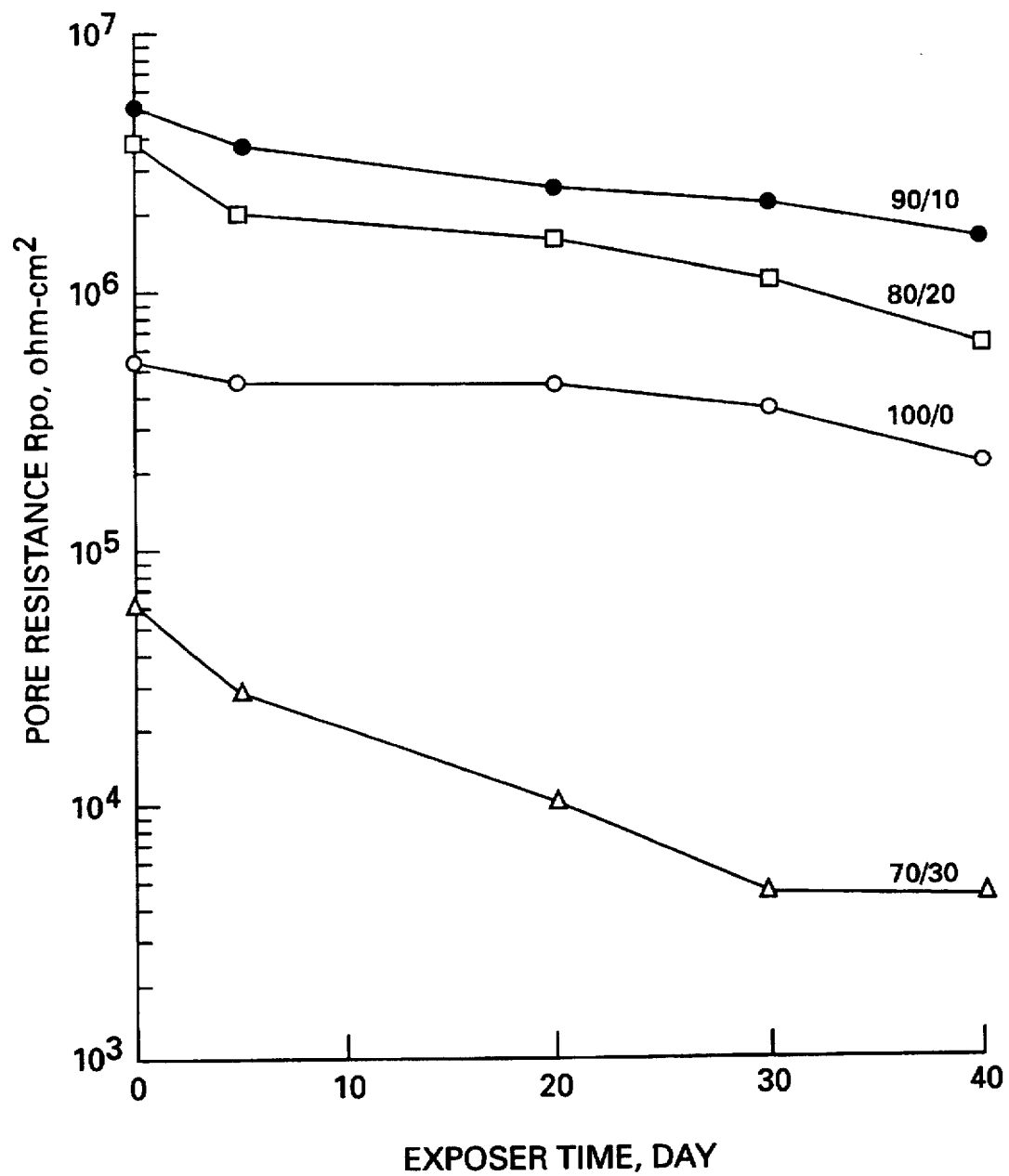
FIG. 10 illustrates changes in pore resistance, R$_{po}$, for coated Al surfaces having TSEP/Cp$_2$ZrCl$_2$ precursor ratios of 100/0, 90/10 80/20, and 70/30 as a function of exposure times.

Furthermore, our attention focused on the changes in $R_{po}$ for coating films after exposure for up to 40 days to 0.5N NaCl solution at 25° C. The results illustrated in FIG. 10 show the relationship between $R_{po}$ and the period of exposure to NaCl solutions. Values of $R_{po}$ for all coating films, except for those having a 70/30 TSEP/$Cp_2ZrCl_2$ ratio, tend to decrease slowly with an elapsed exposure time. Thus, the ability of the coatings to reduce the ionic conductivity gradually weakened during exposure, indicating that a long-term exposure lead to the uptake of more electrolyte by the coating films. For a coating film having 70/30 TSEP/$Cp_2ZrCl_2$ ratio, the drop in $R_{po}$ to a low value was considerably faster than was found for other coatings during exposure to NaCl solution for 30 days; beyond this time, the $R_{po}$ stayed at the same level, corresponding to anodic etching of the underlying aluminum. In fact, the pitting corrosion of aluminum caused by the failure of coating was visually observed in this specimen. The data indicated that after a 40-day exposure, a coating film having a 90/10 TSEP/$Cp_2ZrCl_2$ ratio still maintained an $R_{po}$ of $>10^6$ ohm-$cm^2$, and the ranking of the value of $R_{po}$ at this exposure was the same as that of the unexposed specimens.

Figure 11:
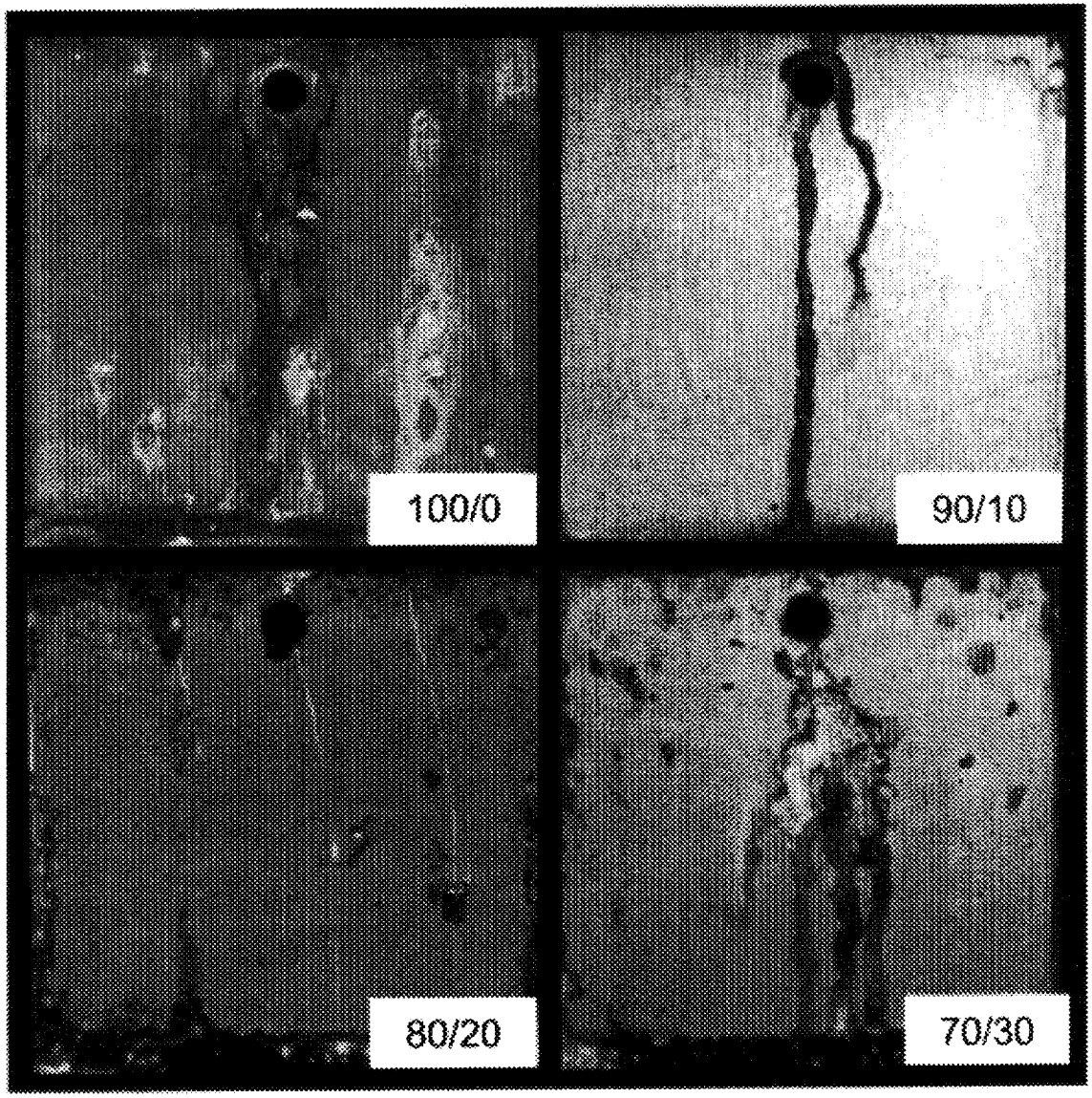
FIG. 11 shows photographs for 3000 hr-salt spray resistance of Al surfaces coated with coating films having precursor ratios of TSEP/Cp$_2$ZrCl$_2$ of 100/0, 90/10, 80/20, and 70/30.

FIG. 11 shows the state of the coated surface for specimens coated with coating films having ratios of TSEP/$Cp_2ZrCl_2$ 100/0, 90/10, 80/20, and 70/30 after salt-spray tests for 3000 hours. Three major failures were generally looked for in evaluating the results from salt-sprayed specimens: 1) the degree of blistering of the film, 2) traces of rust stain, and 3) the delamination of film from aluminum. For example, the entire surface of the uncoated bare aluminum was corroded after exposure to salt fog for only 48 hours. In contrast, although some rust stains were observed surrounding the drilled hole made for hanging the test panels, deposition of the 90/10 TSEP/$Cp_2ZrCl_2$ ratio coating onto aluminum contributed remarkably to protecting it from salt-induced corrosion for 3000 hours. There were no signs of peeling, blistering, or delamination of film from the coated aluminum substrate. Coatings having a TSEP/$Cp_2ZrCl_2$ ratio of 80/20 gave the second best protective performance, compared with other coating systems having TSEP/$Cp_2ZrCl_2$ ratios of 100/0 and 70/30. However, conspicuous rust stains had appeared at the edging of the test panel, suggesting a weakness of the coatings. Partial peeling and severe damage of the corrosion protecting film was observed in a coating film having a TSEP/$Cp_2ZrCl_2$ ratio of 70/30, thereby resulting in a high rate of corrosion. The extent of damage of the 100/0 ratio coating from corrosion was milder than that found in a sample having a TSEP/$Cp_2ZrCl_2$ ratio of 70/30. These findings were similar to the data obtained on the EIS as shown in FIG. 9. Therefore, the most effective coating film for protecting aluminum alloys against corrosion was prepared by using a precursor with a 90/10 TSEP/$Cp_2ZrCl_2$ ratio.

The above analysis of the five characteristics of substrates coated with PZSP coating films and their corrosion resistance as set forth above provide consistent results. For example, with respect to surface wettability, it has been found that the surface tension of film-forming solution decreased with increasing amounts of $Cp_2ZrCl_2$ added to TSEP, thereby resulting in a good wetting performance. Factors b. to d. can be enhanced by controlling the proportions of TSEP sol to $Cp_2ZrCl_2$ solution, and the curing temperatures; the surfaces of coating films derived from a proper TSEP/$Cp_2ZrCl_2$ ratio at 150° C. had a low susceptibility to moisture. The reason for their lesser sensitivity was due to the formation of Si-O-$Cp_2Zr$ linkages generated by dehydrating condensation between the silanol end groups in siloxane and the hydroxyl groups in $Cp_2Zr(OH)_2$ formed by the hydroxylation of $Cp_2ZrCl_2$. However, two critical factors, a low TSEP/$Cp_2ZrCl_2$ ratio and an increase in exposure temperature to 200° C., caused the development of stress-microcracks by the shrinkage of film, because of the exceeding densification of Si-O-Si and Si-O-Zr linkages. Relating to the last factor e., pyridine nitrogen in PZSP seems to have a certain degree of affinity to the oxygen in $Al_2O_3$ existing at the outermost surface sites of aluminum. Such affinity led to the formation of -N→O-Al metal bond structure at the PZSP-$Al_2O_3$ interfaces, indicating that the PZSP coating films strongly adhere to the aluminum surfaces. In other words, this interfacial interaction generates a self-organized molecular structure on metal surfaces as shown in Scheme 1, which structure is different from randomly oriented molecules of a sol solution.

A TSEP/Cp$_2$ZrCl$_2$ ratio of 90/10 was identified as the most preferred precursor ratio resulting in formulation of uniform, continuous, crack-free coating films over aluminum substrates. These coatings had a thickness of from about 0.5 to about 1.0 µm and they displayed the greatest corrosion protection for aluminum substrates. Thus, aluminum substrates coated with films produced from a TSEP/CP$_2$ZrCl$_2$ precursor ratio of 90/10 maintained an impedance of >10$^6$ ohm - cm$^2$ after exposure for 40 days to 0.5N NaCl solution at 25° C. and also showed a 3000 hr salt-spray resistance.

Thus, while we have described what are the preferred embodiments of the present invention, further changes and modifications can be made by those skilled in the art without departing from the true spirit of the invention, and it is intended to include all such changes and modifications as come within the scope of the claims set forth below.

We claim:

1. A compound comprising an organometallic polymer having a repeating monomer of the formula

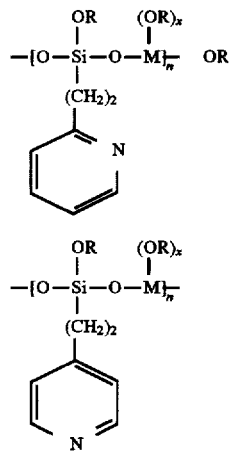

wherein M is a metal derived from an organometallic moiety, said organometallic moiety selected from the group consisting of a metal alkoxide, a metallocene and a metallophtalocyanine, R is CH$_3$, C$_2$H$_5$ or C$_3$H$_7$, x is 0, 1 or 2 and n is equal to or greater than 100.

2. The compound of claim 1, wherein said metal is selected from the group consisting of Zr, Ti, Mo, V, Hf, Nb, Si, B, Al, Ge and mixtures thereof.

3. A corrosion resistant coating which comprises the compound of claim 1.

4. The corrosion resistant coating of claim 3, wherein said metallic surface is selected from the group consisting of aluminum, zinc, magnesium, steel and alloys thereof.

5. A method of rendering a metallic surface of a substrate resistant to corrosion which comprises:

depositing upon a metallic surface of a substrate a coating including the compound of claim 1.

6. The method of claim 5, wherein said coating is from about 0.5 µm to about 1.0 µm.

7. The method of claim 5, wherein said deposition is accomplished by dipping, spraying or spin-coating.

8. The compound of claim 1, wherein said metal alkoxide is M(OR)$_q$, wherein q is 2, 3, 4 and R is CH$_3$, C$_2$H$_5$ or C$_3$H$_7$.

9. The compound of claim 1, wherein said metallocene has the formula (C$_5$H$_5$)$_2$M.

10. The compound of claim 1, wherein said metallophtalocyanine has the formula

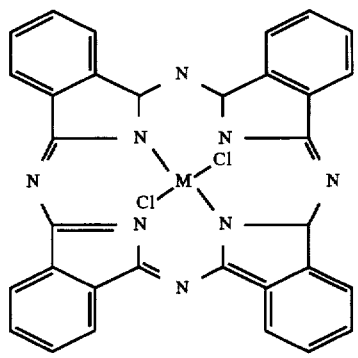

11. A method of making an organometallic polymer having a repeating monomer unit of the formula

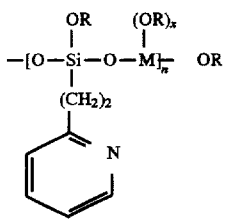

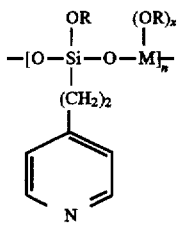

wherein M is a metal derived from an organometallic moiety, in which said moiety is selected from the group consisting of a metal alkoxide, a metallocene and a metallophthalocyanine, R is CH$_3$, C$_2$H$_5$ or C$_3$H$_7$, x is 0, 1 or 2 and n is equal to or greater than 100 which comprises:

reacting a sol solution of β-trimethoxysilylethyl-2-pyridine or β-trimethoxysilylethyl-4-pyridine and a water-soluble organic solvent solution of a compound selected from the group consisting of (i) a metal alkoxide having the formula M(OR)$_q$, wherein R is selected from the group consisting of CH$_3$, C$_2$H$_5$ and C$_3$H$_7$ and q is 2, 3 or 4;

(ii) metallocene dihalide; and (iii) phtalocyaninedihalidemetals under hydrolysis-condensation conditions at temperatures from about 25° C. to about 150° C.

12. The method of claim 11, wherein said metal is selected from the group consisting of Zr, Ti, Mo, V, Hf, Nb, Si, B, Al, Ge and mixtures thereof.

13. The method of claim 11, wherein said metallocene dihalide is selected from the group consisting of metallocene dichloride, metallocene, dibromide and metallocene diodide.

14. The method of claim 11, wherein said phthalocyanatodihalometals are selected from the group consisting of phthalocyanatodichlorometals, phthalocyanatodibromometals, phthdocyanetodiodometals.

15. The method of claim 11, wherein said β-trimethoxysilylethyl-2-pyridine or said β-trimethoxysilylethyl-4-pyridine and said metal alkoxide or said matallocenedihalide or said phtalocyanatodihalometals are in a ratio of 90:10.

16. The method of claim 11, further comprising adding to said aqueous mixture an azo-based water-soluble catalyst selected from the group consisting of 2, 2'-azobis (2-amidinopropane) dihydrochloride, 2'-azobis (N,N'-dimethyleneisobutylamidine) dihydrochloride and mixtures thereof when the hydrolysis condensation occurs at temperatures about 150° C.

17. A corrosion resistant coating prepared by the method of claim 11.

* * * * *